United States Patent
Forenz et al.

(10) Patent No.: US 10,029,941 B2
(45) Date of Patent: Jul. 24, 2018

(54) MACHINING METHODS OF FORMING LAMINATED GLASS STRUCTURES

(71) Applicant: Corning Incorporated, Corning, NY (US)

(72) Inventors: Dominick John Forenz, Hammondsport, NY (US); Walter Jay McKendrick, Painted Post, NY (US); Michael William Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 125 days.

(21) Appl. No.: 15/300,118

(22) PCT Filed: Mar. 26, 2015

(86) PCT No.: PCT/US2015/022615
§ 371 (c)(1),
(2) Date: Sep. 28, 2016

(87) PCT Pub. No.: WO2015/153251
PCT Pub. Date: Oct. 8, 2015

(65) Prior Publication Data
US 2017/0183251 A1    Jun. 29, 2017

Related U.S. Application Data

(60) Provisional application No. 61/972,614, filed on Mar. 31, 2014.

(51) Int. Cl.
*B24B 27/06* (2006.01)
*C03B 33/10* (2006.01)
*C03B 33/02* (2006.01)

(52) U.S. Cl.
CPC .............. *C03B 33/10* (2013.01); *C03B 33/02* (2013.01)

(58) Field of Classification Search
CPC ......... C03B 33/02; C03B 33/10; C03B 33/07; B24B 27/0076; B24B 27/0633; B24B 27/06
(Continued)

(56) References Cited

U.S. PATENT DOCUMENTS 1,731,820 A * 10/1929 Lewis ................... C03B 33/078
                                                125/13.01
1,738,228 A    12/1929 Campbell et al.
(Continued)

FOREIGN PATENT DOCUMENTS

CN    1271646 A    11/2000
CN    1083763 C    5/2002
(Continued)

OTHER PUBLICATIONS

European Search Report, dated Nov. 30, 2017, pp. 1-5, European Patent Application No. EP15774236.2, European Patent Office, The Netherlands.
(Continued)

*Primary Examiner* — George Nguyen

(57) ABSTRACT

A method of shaping a laminated glass structure includes providing the laminated glass structure comprising a flexible glass sheet having a thickness of no greater than about 0.3 mm laminated to a non-glass substrate by an adhesive layer. The flexible glass structure and adhesive layer are ground using a first tool to remove glass material. The non-glass substrate is cut with a second tool different from the first tool through a kerf formed through the flexible glass structure thereby forming a shaped laminated glass structure. A glass
(Continued)

edge strength of a cut edge of the shaped laminated glass structure is at least about 20 MPa.

20 Claims, 7 Drawing Sheets

(58) Field of Classification Search
USPC .............. 451/58, 69–70, 41; 83/862, 49, 42
See application file for complete search history.

(56) References Cited

U.S. PATENT DOCUMENTS

| | | | |
|---|---|---|---|
| 2,022,466 A | | 11/1935 | Hess |
| 3,338,696 A | | 8/1967 | Dockerty |
| 3,682,609 A | | 8/1972 | Dockerty |
| 3,760,997 A | * | 9/1973 | Bier ................... C03B 33/10 225/2 |
| 4,018,372 A | * | 4/1977 | Insolio ............. C03B 33/0235 225/2 |
| 4,113,162 A | | 9/1978 | Boehm et al. |
| 4,213,550 A | * | 7/1980 | Bonaddio ............ C03B 33/10 225/2 |
| 5,154,334 A | * | 10/1992 | Dekker .................. B26F 3/06 225/2 |
| 5,227,241 A | * | 7/1993 | Chaussade ....... B32B 17/10036 428/437 |
| 6,588,477 B2 | | 7/2003 | Habeck et al. |
| 6,861,136 B2 | | 3/2005 | Verlinden et al. |
| 7,314,403 B2 | * | 1/2008 | Uh ........................ B24B 9/06 348/126 |
| 8,525,405 B2 | | 9/2013 | Kuwabara et al. |
| 2002/0134485 A1 | | 9/2002 | Habeck et al. |
| 2004/0069770 A1 | | 4/2004 | Cary et al. |
| 2004/0232124 A1 | | 11/2004 | Nagai et al. |
| 2008/0050888 A1 | * | 2/2008 | Garner .................. B23K 26/38 438/463 |
| 2008/0066387 A1 | | 3/2008 | Bonner et al. |
| 2008/0236199 A1 | * | 10/2008 | Sklyarevich .......... C03B 33/078 65/97 |
| 2009/0311497 A1 | | 12/2009 | Aoki |
| 2011/0081542 A1 | | 4/2011 | Pilloy et al. |
| 2011/0250423 A1 | | 10/2011 | Fukasawa et al. |
| 2012/0034435 A1 | | 2/2012 | Borrelli et al. |
| 2012/0128952 A1 | | 5/2012 | Miwa et al. |
| 2012/0200480 A1 | | 8/2012 | Qi et al. |
| 2013/0217315 A1 | | 8/2013 | Wiand et al. |
| 2013/0312341 A1 | | 11/2013 | Gy et al. |
| 2014/0054348 A1 | | 2/2014 | Teranishi et al. |
| 2015/0239140 A1 | * | 8/2015 | Majestic ............... B28B 11/163 264/433 |

FOREIGN PATENT DOCUMENTS

| | | |
|---|---|---|
| CN | 102350661 A | 2/2012 |
| EP | 0945221 A2 | 9/1999 |
| EP | 2481543 A1 | 8/2012 |
| EP | 1038663 B1 | 12/2012 |
| EP | 2542407 B1 | 12/2013 |
| JP | 07081959 A | 3/1995 |
| JP | 09309736 A | 12/1997 |
| JP | 2003335536 A | 11/2003 |
| JP | 2005263578 A | 9/2005 |
| JP | 03735231 B2 | 1/2006 |
| JP | 2009069759 A | 4/2009 |
| JP | 04275121 B2 | 6/2009 |
| JP | 04392127 B2 | 12/2009 |
| JP | 2012076945 A | 4/2012 |
| JP | 2012076947 A | 4/2012 |
| JP | 05358439 B2 | 12/2013 |
| KR | 2014006958 A | 1/2014 |
| TW | 580485 B | 3/2004 |
| WO | 2014030521 A1 | 2/2014 |
| WO | 2014035942 A1 | 3/2014 |

OTHER PUBLICATIONS

International Seach Report and Written Opinion Dated June 29, 2015; pp. 1-10, International Patent Application No. PCT/US2015/022615, Korean Intellectual Property Office, Republic of Korea.

* cited by examiner

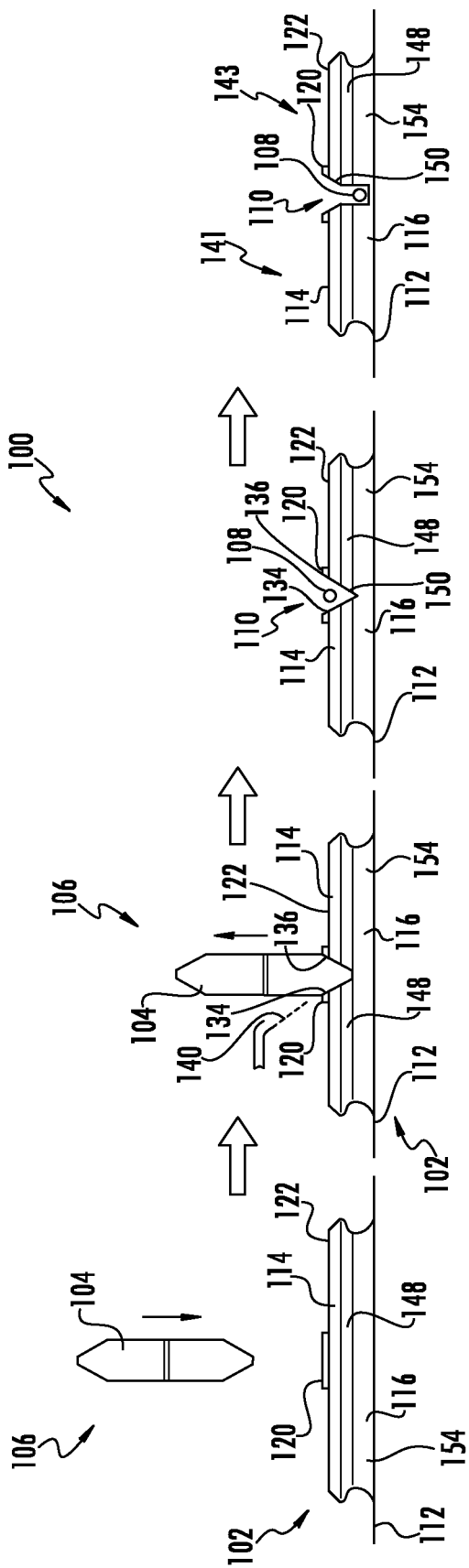

MACHINING METHODS OF FORMING LAMINATED GLASS STRUCTURES

CROSS-REFERENCE TO RELATED APPLICATIONS

This application claims the benefit of priority under 35 U.S.C. § 371 of International Patent Application Serial No. PCT/US15/22615, filed on Mar. 26, 2015, which in turn, claims the benefit of priority of U.S. Provisional Patent Application Ser. No. 61/972,614 filed on Mar. 31, 2014, the contents of each of which are relied upon and incorporated herein by reference in their entireties.

FIELD

The present disclosure relates to glass-laminate structures and, more particularly, to methods of shaping laminated glass structures.

BACKGROUND

Laminated glass structures may be used as components in the fabrication of various appliances, automobile components and architectural structures or electronic devices. For example, laminated glass structures may be incorporated as cover glass for various end products such as refrigerators, backsplashes, decorative glazing or televisions. However, it may be difficult to cut or otherwise shape the laminated glass structures using machining methods typically used in manufacturing environments without causing fractures in the glass layer given limitations of the machining methods that might be used and properties of the laminated glass structures. For example, many such machining methods are not used to cut glass, plastic or adhesives. Accordingly, there is a need for methods of shaping laminated glass structures using machining methods used in manufacturing environments to minimize the effort and cost of glass laminate use and installation.

SUMMARY

One technique to improve the mechanical reliability of flexible glass is to laminate, or bond, the flexible glass to one or more laminate materials or substrates of unique structures. Flexible glass may be glass having a thickness of 300 microns or less, including but not limited to, 300, 275, 250, 225, 200, 190, 180, 170, 160, 150, 140, 130, 120, 110, 100, 90, 80, 70, 60, 50, 40, 30, 20, or 10 microns. Additionally, the flexible glass may have a thickness in a range of from 100 to 200 microns. Depending on the mechanical strength and impact resistance requirements of a laminated glass structure, as well as the expected bending stresses and direction of the intended application, a laminated glass structure can be designed to meet various mechanical requirements. When used properly, the laminated glass structures can offer improved mechanical reliability and impact resistance performance over unlaminated flexible glass.

Once the laminated glass structures are formed, it can become necessary to cut or otherwise shape them. To this end, methods of shaping the laminated glass structures are described herein where cutting/grinding devices that are used to effectively cut the laminated glass structures to desired shapes while minimizing damage to the flexible glass sufficient to diminish edge strength below a predetermined amount (for example 20 MPa as cut, whereby edge strength can be maintained at 20 MPa or higher, for example 50 MPa, or 70 MPa, or 90 MPa, after finishing) and/or initiate radial or circumferential crack propagation. The laminated glass structures can be used, for example, as a backsplash for kitchen installation, wherein a larger laminated glass structure can be cut down in a manufacturing environment to a preselected size.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, a method of shaping a laminated glass structure comprises:

providing the laminated glass structure comprising a flexible glass sheet having a thickness of no greater than about 0.3 mm laminated to a non-glass substrate by an adhesive layer;

grinding the flexible glass structure and adhesive layer using a first tool to remove glass material; and cutting the non-glass substrate with a second tool different from the first tool through a kerf formed through the flexible glass structure thereby forming a shaped laminated glass structure;

wherein a glass edge strength of a cut edge of the shaped laminated glass structure is at least about 20 MPa.

According to a second aspect, there is provided the method of aspect 1, wherein the first tool is an abrasive wheel having an ISO/FEPA grit designation of at least 180 or a higher grit number.

According to a third aspect, there is provided the method of aspect 1 or aspect 2, wherein the second tool is a metal wire electrode of a wire-cut EDM machine.

According to a fourth aspect, there is provided the method of aspect 1, wherein the first tool is a first abrasive wheel and the second tool is a second abrasive wheel having an ISO/FEPA grit designation different from the first abrasive wheel.

According to a fifth aspect, there is provided the method of aspect 4, wherein the step of grinding the flexible glass structure and adhesive layer using the first tool comprises cutting the flexible glass structure using the first abrasive wheel to form the kerf.

According to a sixth aspect, there is provided the method of aspect 5, wherein the second grinding wheel has a width less than the width of the kerf of the of the first abrasive wheel.

According to a seventh aspect, there is provided the method of aspect 1, wherein the first tool is an abrasive wheel and the second tool is a metal wire electrode of a wire-cut EDM machine.

According to an eighth aspect, there is provided the method of aspect 7, wherein the step of grinding the flexible glass structure and adhesive layer using the first tool comprises cutting the flexible glass structure using the abrasive wheel to form the kerf.

According to a ninth aspect, there is provided the method of aspect 7 or aspect 8, wherein the metal wire electrode has a diameter less than a width of the kerf.

According to a tenth aspect, there is provided the method of aspect 1, wherein the first tool is a first region of an abrasive wheel having a first ISO/FEPA grit designation and the second tool is a second region of the abrasive wheel having a second ISO/FEPA grit designation different from the first ISO/FEPA grit designation.

According to an eleventh aspect, there is provided the method of any one of aspects 1-10, further comprising sanding the shaped laminated glass structure along the cut edge using a sand paper.

According to a twelfth aspect, there is provided the method of aspect 11, wherein the sand paper has an ISO/FEPA grit designation of 180 or a higher grit number.

According to a thirteenth aspect, a method of shaping a laminated glass structure comprises:

providing the laminated glass structure comprising a flexible glass sheet having a thickness of no greater than about 0.3 mm laminated to a non-glass substrate by an adhesive material;

supporting the preform laminated glass structure on a support surface such that the non-glass substrate is located between the flexible glass sheet and the support surface; and cutting the non-glass substrate with a tool through a kerf formed through the flexible glass structure thereby forming a shaped laminated glass structure.

According to a fourteenth aspect, there is provided the method of aspect 13, wherein a glass edge strength of a cut edge of the shaped laminated glass structure at least about 20 MPa.

According to a fifteenth aspect, there is provided the method of aspect 13 or aspect 14, wherein the tool is an abrasive wheel having an ISO/FEPA grit designation of at least 180 or higher.

According to a sixteenth aspect, there is provided the method of aspect 13, wherein the tool is a first tool, the method further comprising grinding the flexible glass structure and adhesive layer using a second tool forming the kerf.

According to a seventeenth aspect, there is provided the method of aspect 16, wherein the second tool is a metal wire electrode of a wire-cut EDM machine.

According to an eighteenth aspect, there is provided the method of aspect 16, wherein the first tool is a first abrasive wheel and the second tool is a second abrasive wheel having an ISO/FEPA grit designation different from the first abrasive wheel.

According to a nineteenth aspect, there is provided the method of aspect 18, wherein the first abrasive wheel has a width less than the width of the kerf of the of the first abrasive wheel.

According to a twentieth aspect, there is provided the method of aspect 16, wherein the first tool is a metal wire electrode of a wire-cut EDM machine and the second tool is an abrasive wheel.

According to a twenty-first aspect, there is provided the method of aspect 20, wherein the metal wire electrode has a diameter less than a width of the kerf created by the abrasive wheel.

According to a twenty-second aspect, there is provided the method of aspect 16, wherein the first tool is a first region of an abrasive wheel having a first ISO/FEPA grit designation and the second tool is a second region of the abrasive wheel having a second ISO/FEPA grit designation different from the first ISO/FEPA grit designation.

According to a twenty-third aspect, there is provided the method of any one of the aspects 13-22, further comprising sanding the shaped laminated glass structure along a cut edge using a sand paper.

According to a twenty-fourth aspect, there is provided the method of aspect 23, wherein the sand paper has an ISO/FEPA grit designation of at least 180 or higher.

BRIEF DESCRIPTION OF THE DRAWINGS

These and other features, aspects and advantages of the present disclosure are better understood when the following detailed description of the disclosure is read with reference to the accompanying drawings, in which:

FIG. 3 depicts a diagrammatic end view of a system and method for shaping a laminated glass structure in accordance with aspects of the disclosure;

FIG. 4A illustrates an abrasive wheel of a grinding machine for use in the method of FIG. 3 operating in a climb cut orientation in accordance with aspects of the disclosure.

FIG. 4B illustrates an abrasive wheel of a grinding machine operating in an anti-climb cut direction in accordance with aspects of the disclosure;

DETAILED DESCRIPTION

Figure 1:
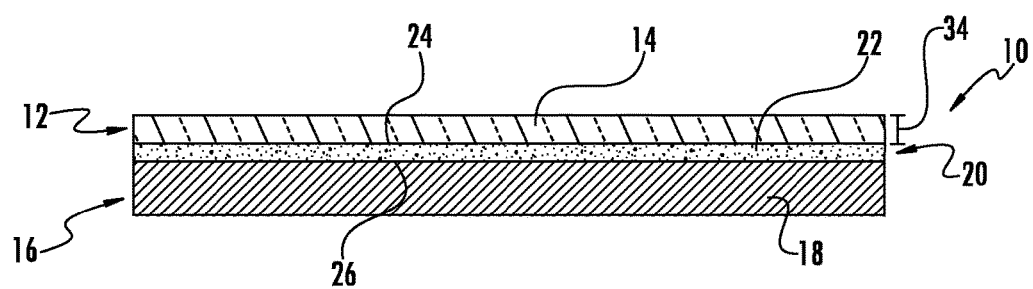
FIG. 1 illustrates a cross-sectional view of one embodiment of a laminated glass structure in accordance with aspects of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Although glass is an inherently strong material, its strength and mechanical reliability is a function of its surface defect or flaw size density distribution and the cumulative exposure of stress to the material over time. During an entire product life cycle, a laminated glass structure may be subjected to various kinds of static and dynamic mechanical stresses. Embodiments described herein generally relate to methods of shaping (e.g., cutting) laminated glass structures in a machining environment. Particular examples discussed herein relate to laminated glass structures where the non-glass substrate is a polymer and/or metal or metal alloy, such as stainless steel, aluminum, nickel, magnesium, brass, bronze, titanium, tungsten, copper, cast iron or a noble metal.

Referring to FIG. 1, a cross-sectional view of an exemplary laminated glass structure 10 is illustrated. The laminated glass structure 10 includes a flexible glass layer 12 that is formed of a flexible glass sheet 14 and a non-glass substrate layer 16 that is laminated to the flexible glass layer 12. The non-glass substrate layer 16 is formed of a non-glass substrate 18, such as polymer, wood, or wood-based products such as chipboard, particleboard, fiberboard, and cardboard, hardboard, or low pressure laminate, high pressure laminate, or veneer, or metal or metal alloys such as stainless steel, copper, nickel, brass, bronze, titanium, tungsten, cast iron, aluminum, ceramic, composite, or another polymer or rigid material or combinations of these materials.

The non-glass substrate 18 may be formed using a polymer material, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes, as well as ethylenevinylacetates and ionomers. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

An adhesive layer 20 may be formed of an adhesive material 22 that may be used to laminate the flexible glass layer 12 to the non-glass substrate layer 16 at the interfaces between their respective broad surfaces 24 and 26. The adhesive material 22 may be a non-adhesive interlayer, an adhesive, a sheet or film of adhesive, a liquid adhesive, a powder adhesive, a pressure sensitive adhesive, an ultraviolet-light curable adhesive, a thermally curable adhesive, or other similar adhesive or combination thereof. The adhesive material 22 may assist in attaching the flexible glass 14 to the non-glass substrate 18 during lamination. Some examples of low temperature adhesive materials include Norland 68 cured by UV, Flexcon V29TT, 3M OCA 8211, 8212, 8146, and 8172 (bonded by pressure at room temperature), 3M 4905, OptiClear® adhesive, silicones, acrylates, optically clear adhesives, encaptulant material, polyurethane polyvinylbuterates, ethylenevinylacetates, ionomers, and wood glues. Typical graphic adhesives such as Graphicmount and Facemount may also be used (as available from LexJet Corporation, located in Sarasota Fla., for example). Some examples of higher temperature adhesive materials include DuPont SentryGlas, DuPont PV 5411, Japan World Corporation material FAS and polyvinyl butyral resin. The adhesive layer 20 may be thin, having a thickness less than or equal to about 1000 µm, including less than or equal to about 500 µm, about 250 µm, less than or equal to about 50 µm, less than or equal to about 40 µm, less than or equal to about 25 µm, or between about 0.1 mm and about 5 mm. The adhesives may also contain other functional components such as color, decoration, heat or UV resistance, AR filtration etc. The adhesive material 22 may be optically clear on cure, or may otherwise be opaque. In embodiments where the adhesive material 22 is a sheet or film of adhesive, the adhesive material 22 may have a decorative pattern or design visible through the thickness of the flexible glass, as shown in FIG. 2.

Figure 2:
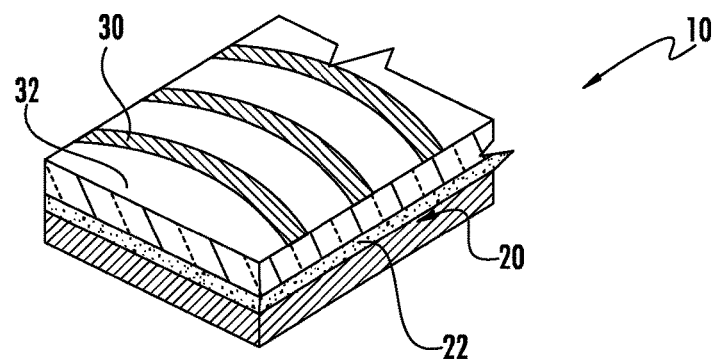
FIG. 2 depicts a cross-sectional view of the laminated glass structure of FIG. 1 with a decorative pattern located on one or more of the glass surface or upon a film located between the substrate and the flexible glass layer in accordance with aspects of the disclosure.

In FIG. 2, the laminated glass structure 10 includes an adhesive layer 20 formed of a sheet or film of adhesive material 22. The adhesive material 22 has a pattern of stripes 30 that are visible from an outer surface 32 of the flexible glass layer 12. In some embodiments, the non-glass substrate layer may provide a decorative pattern and/or the decorative pattern may be provided on either surface of the flexible glass sheet 14. In some embodiments, the decorative pattern may be provided on multiple layers 12, 16 and/or 20. Some air bubbles may become entrained in the laminated glass structure during or after lamination, but air bubbles having a diameter of equal to or less than 100 μm may not affect the impact resistance of the laminated glass structure. Formation of air bubbles may be reduced by use of a vacuum lamination system or application of pressure to a surface of the structure during lamination. In other embodiments, the flexible glass layer 12 may be laminated without adhesive.

The flexible glass sheet 14 may have a thickness 34 of about 0.3 mm or less including but not limited to thicknesses of, for example, about 0.01-0.05 mm, about 0.05-0.1 mm, about 0.1-0.15 mm, about 0.15-0.3 mm, about 0.100 to about 0.200 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass sheet 14 may be formed of glass, a glass ceramic, a ceramic material or composites thereof. A fusion process (e.g., down draw process) that forms high quality flexible glass sheets can be used in a variety of devices and one such application is flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw and slot draw methods. Additionally, the flexible glass sheet 14 may also contain anti-microbial properties by using a chemical composition for the glass including an Ag ion concentration on the surface in the range greater than 0 to 0.047 μg/cm$^2$, further described in U.S. Patent Application Publication No. 2012/0034435 A1. The flexible glass 14 may also be coated with a glaze composed of silver, or otherwise doped with silver ions, to gain the desired anti-microbial properties, as further described in U.S. Patent Application Publication No. 2011/0081542 A1. Additionally, the flexible glass 14 may have a molar composition of 50% $SiO_2$, 25% CaO, and 25% $Na_2O$ to achieve the desired anti-microbial effects.

Once the flexible glass sheet 14 is formed, it may be laminated to the non-glass substrate 18 using a variety of apparatus and processes. Some examples include sheet-to-sheet lamination where pressure and/or heat are used to bond the flexible glass sheet 14 to the non-glass substrate 18, for example, using the adhesive material 22. As another example, a roll-to-sheet or roll-to-roll lamination method may be used where; again, pressure is used to bond a continuous ribbon of flexible glass sheet 14 from a supply roll to a non-glass substrate 18 either as a continuous substrate from a supply roll or a plurality of individual substrates. While it may be possible to form the laminated glass structure to a final, desired dimension, it may be the case that some type of shaping (e.g., cutting) of the laminated glass structure will be needed after the laminated glass structure is formed. In these instances, the laminated glass structure may be referred to as a preform laminated glass structure in that the preform laminated glass structure will undergo final processing in the field, for example, at an installation site to desired dimensions.

Without wishing to be bound by theory, one difficulty that may be encountered during cutting of the laminated glass structures to a predetermined dimension is maintaining an acceptable edge quality of the flexible glass sheet 14. Edge quality of the flexible glass sheet 14 is related to edge strength and the possibility of initiation/formation of undesirable or unintended cracks and fractures in the flexible glass sheet 14. In some embodiments, it may be desirable to maintain a predetermined edge strength in the flexible glass sheet 14 after cutting. For example, maintaining an edge strength in the flexible glass sheet 14 of at least about 20 MPa (for example, at least 50 MPa, 60 MPa, 70 MPa, 80 MPa, 90 MPa, 100 MPa, or higher) can allow the flexible glass sheet 14 of the laminated glass structure 10 to survive end use conditions, such as handling and installation, without forming cracks and fractures in the flexible glass sheet 14. However, specialized tools for cutting the flexible glass sheet 14 are generally not available in manufacturing environments. It has been found that, under predetermined conditions, manufacturing-based cutting methods and equipment that are not typically used for cutting at least one of the materials in the laminated glass structure can be used to cut the laminated glass structures 10 (e.g., flexible glass sheet 14, adhesive material 22 and non-glass substrate 18), and, in some embodiments, with a subsequent edge finishing process can maintain a predetermined edge strength of at least 20 MPa (for example, at least 50 MPa or 60 MPa) in the flexible glass sheets 14. Edge finishing of the laminated glass structures 10 using sand paper of greater grit designation may be employed to further improve the glass edge quality and strength to 70 MPa or greater (for example, at least 80 MPa, 90 MPa, 100 MPa, or higher).

Referring to FIG. 3, a multi-step method 100 of shaping a preform laminated glass structure 102 using a cutting tool such as an abrasive wheel 104 of a grinding machine (generally illustrated as element 106) and a metal wire electrode 108 using a wire electrical discharge machine (WEDM) (generally illustrated as element 110) is illustrated. As used herein, the term "cutting tool" refers to any cutting tool suitable for removing glass material from the preform laminated glass structure without causing significant damage so as to be able to achieve edge strengths in the flexible glass sheets of at least about 20 MPa (for example, at least 50 MPa, 60 MPa, 70 MPa, 80 MPa, 90 MPa, 100 MPa, or higher) before or after any edge finishing as described herein. Alternatively, one or more router bits may be used as the first and/or second tools, i.e., instead of either one or both of the abrasive wheel 104 or the metal wire electrode 108. The preform laminated glass structure 102 may be supported on a surface 112 of a support structure, such as a reciprocating table for a grinding process (e.g., a creep feed grinding process) using the abrasive wheel 104 with a flexible glass sheet 114 of the preform laminated glass structure 102 facing away from the surface 112 of the support structure and a non-glass substrate 116 sandwiched between the flexible glass sheet 114 and the support surface 112.

A mask 120 (e.g., a tape) may be applied to a broad surface 122 of the flexible glass sheet 114. As an example, the mask 120 may be strips of tape applied along an intended cutting line and at outer edges where clamps may be applied to support the preform laminated glass structure 102 and inhibit vibration. The mask 120 can be used to protect the surface 122 and also to inhibit bonding and collection of glass chips along the cut edges 134 and 136 and on the surface 122. Where the mask 120 is applied can depend on a number of factors, such as the abrasive wheel used, where the preform laminated glass structure 102 is being supported and the final (or useful) laminated glass structure versus the scrap. In some embodiments, each piece of the preform laminated glass structure 102 may be useful, while in other embodiments, one or more pieces of the preform laminated glass structure 102 may be scrap. In some embodiments, both of the scrap portion and useful portion of the preform laminated glass structure 102 may be supported (e.g., using clamps).

A liquid or fluid, for example, a cutting fluid 140, such as water or other liquid solution, may (or may not) be supplied to the surface 122 of the preform laminated glass structure 102 from a fluid supply (e.g., a water tap). The cutting fluid 140 may be applied through the grinding machine 106 or by any other suitable method, such as from a container or using a hose. The cutting fluid 140 can reduce friction between a cutting edge of the abrasive wheel 104, while also protecting the cut edges 134 and 136 and surface 122 of the preform laminated glass structure 102 from scratches and contamination caused by the deposit of abrasive particles or chips made during the grinding process.

A cut may be initiated in the flexible glass sheet 114 using the abrasive wheel 104 of the grinding machine 106. In some embodiments, the grinding machine 106 may include a reciprocating table as the support surface 112, which can be used to feed the preform laminated glass structure 102 at a desired rate (e.g., between about 50 mm/min and about 150 mm/min). The abrasive wheel 104 may be operated in a climb cut orientation. As used herein, a "climb cut orientation" refers to the abrasive wheel applying a compressive stress Sc to the flexible glass sheet during a cutting operation moving in direction D (FIG. 4A) as opposed to an "anti-climb cut operation," which applies a tensile stress St to the flexible glass sheet using the abrasive wheel moving in direction D (FIG. 4B). Use of the climb cut can avoid fracturing the flexible glass layer of the laminated glass structure 102. The feed or cutting rate can be dependent on the preform laminated glass structure 102 (glass thickness, type and thickness of the non-glass substrate and adhesive). For example, the feed rate may be about 102 mm/min at 6,700 surface feet per minute (SFPM). Multiple passes may be used. As one example, multiple cuts (e.g., of about 0.001 inch (0.025 mm) or less, such as about 0.0005 inch (0.0125 mm) depth cuts) may be made per pass using the abrasive wheel 104 cutting through the flexible glass sheet 114. However, greater or less than 0.0005 inch (0.0125 mm) depth cuts may be used.

The abrasive wheel 104 may be used primarily to cut the flexible glass sheet 114 and adhesive layer 148. The abrasive wheel 104 may be selected to cut the flexible glass sheet 114 with a sufficiently large kerf 150 (e.g., 0.05 inch (1.25 mm) in width or greater, such as 0.1 inch (2.54 mm) in width or greater) such that the wire electrode 108 for the WEDM process can pass though the kerf 150, without touching the cut edges 134 and 136. The abrasive wheel 104 may be any suitable type, such as an 8 inch (20.3 cm) 240 grit electroplated abrasive wheel having a 90 degree angle and 0.010 inch (0.25 mm) flat. The abrasive grit size, or diameter of the abrasive particles, can play a significant role in quality of the cut. The surface finish quality, smoothness, and amount of chipping can all be affected by the grit size. The finer the grit, the smoother the cut will be and the rougher the grit, the coarser the resulting cut.

As indicated above, multiple passes may be used to cut through the flexible glass sheet 114 with each pass cutting at the same or a different depth than the pass before. The abrasive wheel 104 may also be used to cut through the adhesive layer 148. The adhesive layer 148 can impede the cutting process by adhering to the abrasive wheel 104. For this reason, thinner adhesive layers 148 with a high elastic modulus may be used as they tend to not adhere as readily to the abrasive wheel 104, which can allow for faster cutting rates though the adhesive layer 148. Once the abrasive wheel 104 cuts through the adhesive layer 148 with one or more passes, the abrasive wheel may be used to score the non-glass substrate layer 154 to facilitate or begin a second cutting operation.

Referring still to FIG. 3, the second cutting operation utilizes a wire discharge machine 110 (e.g., a CNC wire discharge machine) and metal wire electrode 108 as the cutting tool. The metal wire electrode 108 has a diameter (e.g., 0.004 inch, 0.1 mm) that is size to be received within the kerf 150 of the flexible glass sheet 114 and adhesive layer 148. Material is removed from the non-glass substrate layer 154 (e.g., a metal) by a series of rapidly recurring current discharges between the metal wire electrode 108 and the non-glass substrate layer 154, separated by a dielectric liquid and subject to an electric voltage. As the sparks jump, material is removed from the non-glass substrate layer 154 and the metal wire electrode 108 until a cut is formed through the non-glass substrate layer 154. Once the cut is complete, the mask 120 can be removed and the cut laminated glass structures 141 and 143 can be rinsed and dried. However, the heat and stresses introduced into the non-glass substrate layer 154 during the WEDM process can transfer heat to the flexible glass sheet 114 through the adhesive layer 148. Such heat transfer to the flexible glass sheet 114 can result in the generation of new glass chips or exacerbate any glass chips produced by the grinding operation.

Figure 5:
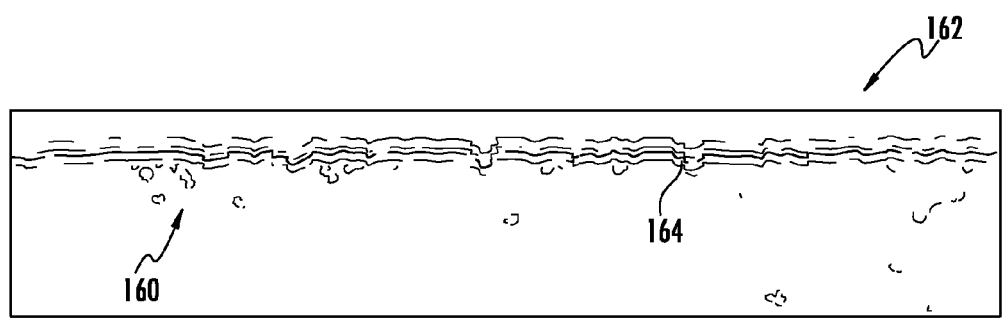
FIG. 5 illustrates a cut edge of a laminated glass structure formed in accordance with the method of FIG. 3 before finishing in accordance with aspects of the disclosure.
Figure 6:
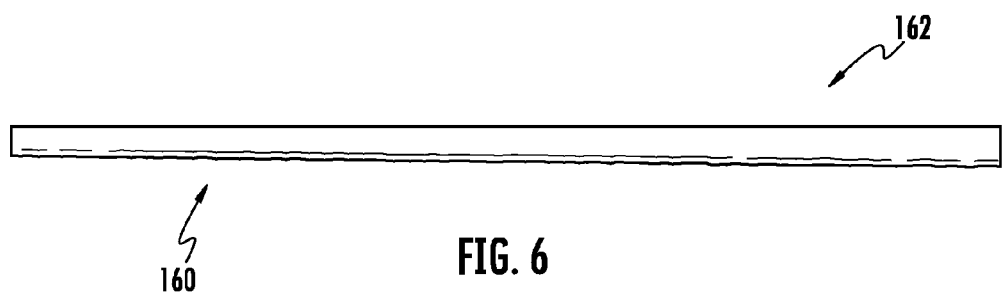
FIG. 6 illustrates the cut edge of FIG. 5 after finishing in accordance with aspects of the disclosure.
Figure 7:
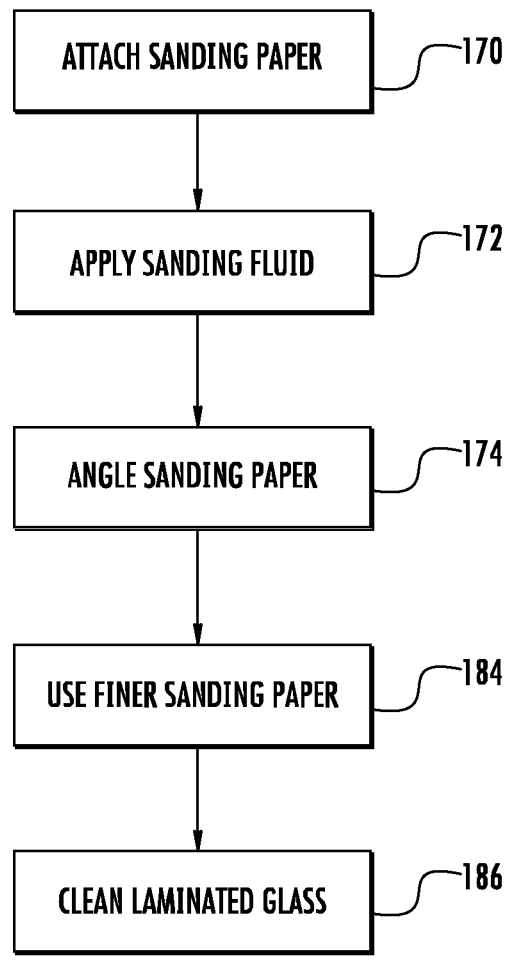
FIG. 7 illustrates a method of finishing a cut edge of a laminated glass structure in accordance with aspects of the disclosure.
Figure 8A:
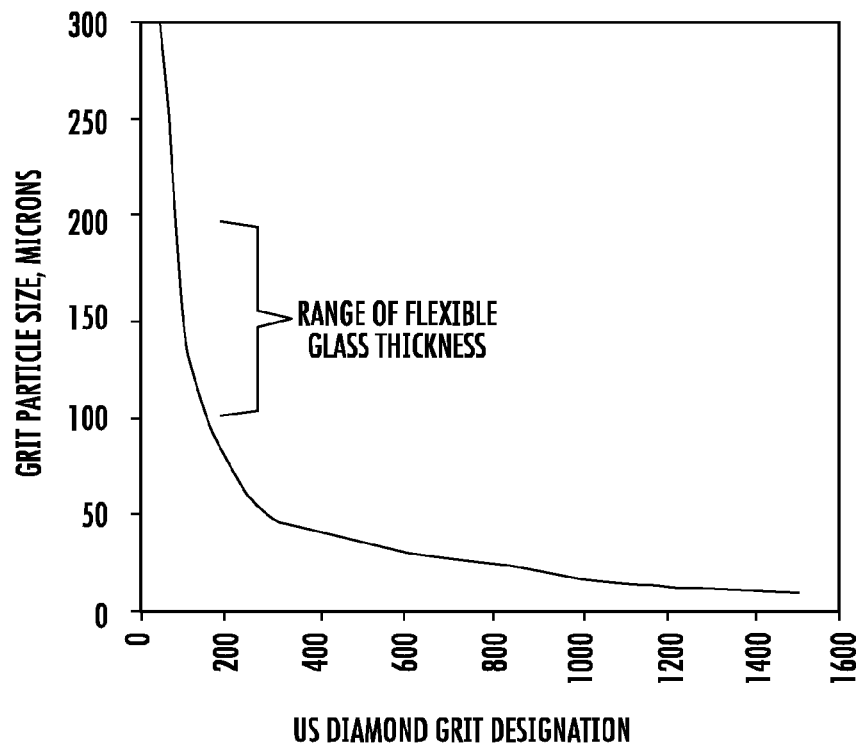
FIG. 8A illustrates a chart of grit particle size versus US diamond grit designation.
Figure 8B:
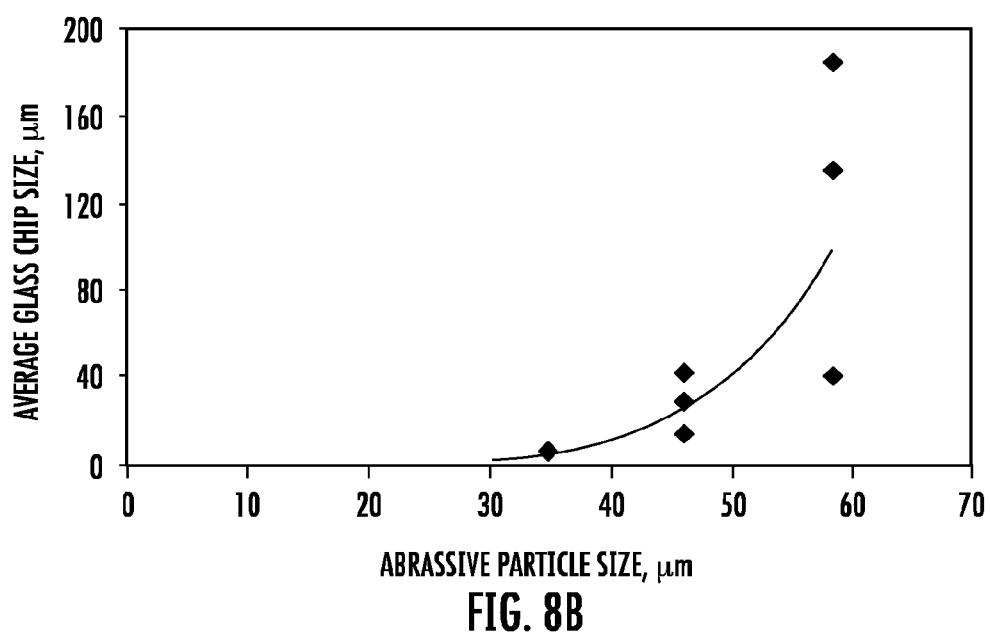
FIG. 8B illustrates a chart of average glass chip size versus abrasive particle size.
Figure 8C:
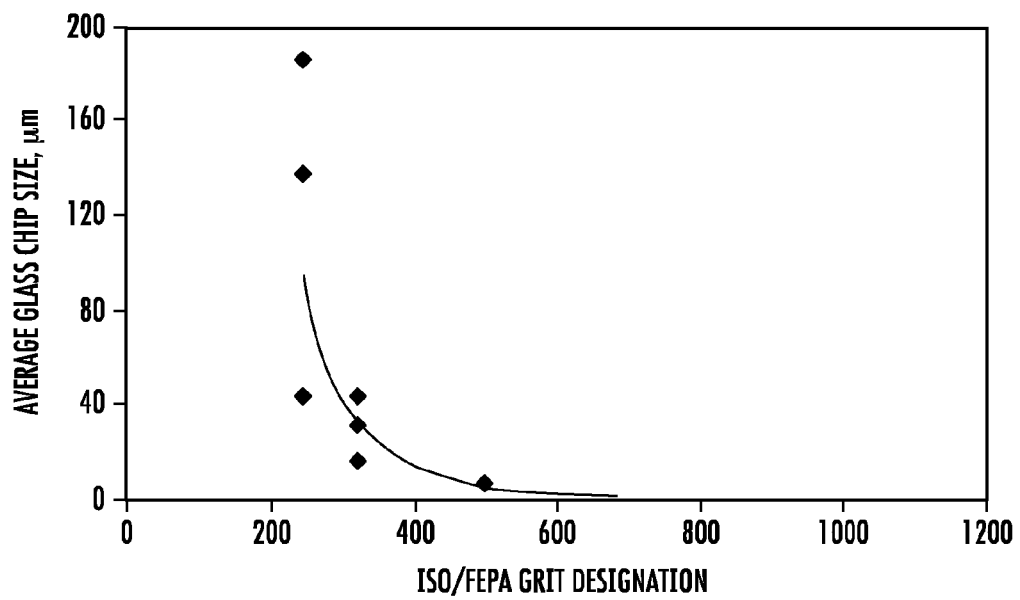
FIG. 8C illustrates a chart of average glass chip size versus ISO/FEPA grit designation.

FIG. 5 illustrates a cut edge 160 of a flexible glass sheet 162 cut in the manner described above. Due to the cutting process, rounded and/or straight chips 164 may be created along the cut edge 160. In some embodiments, a finishing operation or multiple finishing operations may be desired to remove or reduce the size of the chips 164 and create a smoother or cleaner cut edge 160 (FIG. 6). Referring to FIG. 7, at step 170, a suitable sand paper (e.g., AlOx, SiC; at least 180 grit) is attached to a sanding block. Power finishing may also be achieved using several commonly utilized tools such as belt sanders and orbital sanders, for example. Referring briefly to FIGS. 8A-8C, charts comparing grit size to flexible glass sheet thickness and glass chip sizes are illustrated. To minimize glass edge chipping during either a cutting or finishing operation, the grit size used should be much smaller than the thickness of the flexible glass sheet to produce any chip sizes less than a predetermined depth (e.g., about 20 μm or less). In some embodiments, grit size designations of 1800 or finer, for example, 220 grit, 400 grit, 600 grit, and 800 grit, or finer may be used. As shown in FIG. 8A, when a flexible glass thickness of 100 to 200 microns is used, a grit size of 600 has a grit particle size of less than 50 microns, i.e., about 30 microns and much smaller than the thickness of the flexible glass. For example, when a flexible glass thickness of 200 microns is used, a grit size of 180 or more has a grit particle size of less than 200 microns, and can successfully be used as a starting point for finishing the glass edge. As an additional example, using abrasive particles during the cutting process having an average diameter of less than about ¼, such as less than about ⅕ of the thickness of the flexible glass sheet can significantly reduce edge chipping and obtain glass edge strengths of about 20 MPa or more, for example 50 MPa or more. As shown in FIGS. 8B and 8C, an abrasive grit particle size of 30 microns (from ISO/FEPA Grit Designation 600) produces negligible average glass chip sizes. In some instances, an ISO/FEPA Grit Desingnation of 180 ore more can produce negligible average glass chip sizes. Finishing angles are also beneficially selected to successfully preserve the attributes of the cut and finished laminate structure. Angles from 23 degrees to 87 degrees can be effective. In some instances angles of 70-85 degrees are desired.

Figure 9:
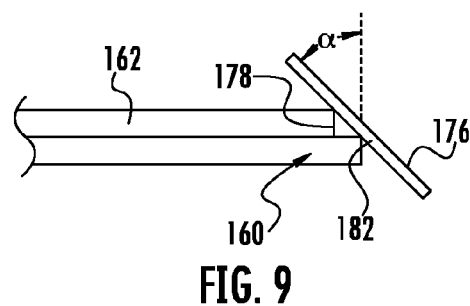
FIG. 9 illustrates a method of sanding a cut edge of a laminated glass structure in accordance with aspects of the disclosure.

Referring back to FIG. 7, at step 172, a fluid, for example, a sanding fluid such as water may be applied along the cut edge 160. At step 174, the sand paper and sanding block may be held at an angle to the cut edge 160 (i.e., at an angle to a plane transverse to the broad surface of the flexible glass sheet). FIG. 9 illustrates the sand paper 176 contacting the cut edge 160 at angle α to the cut edge 160 (e.g., from about five to about 89 degrees, for example, from about five to about 45 degrees, for example 45 degrees, or from about 70 to about 89 degrees, or about 70 to about 80 degrees for example). Such an arrangement can produce an edge 178 of the flexible glass sheet 162 offset inwardly of an edge 180 of the non-glass substrate 182 and can provide some protection for the edge 160, for example, during handling by extending the edge 178 beyond the edge 160. Referring back to FIG. 7, once the initial sanding operation is complete using the 600 grit sand paper, finer grit sand paper (800 grit) may be used at the same angle α for a finishing operation at step 184. According to other examples, a range of grit sizes from 180 to 800 may be successively used, for example, an initial 180 grit sandpaper may be used, and then one or more of 220 grit, 400 grit, 600 grit, 800 grit, or finer. At step 186, the laminated glass structure may be rinsed and dried. Vibratory, belt, disc sanders, and sanders utilizing compliant support structures for the media are preferred, and may be used in a fashion similar to that described above.

Figure 10:
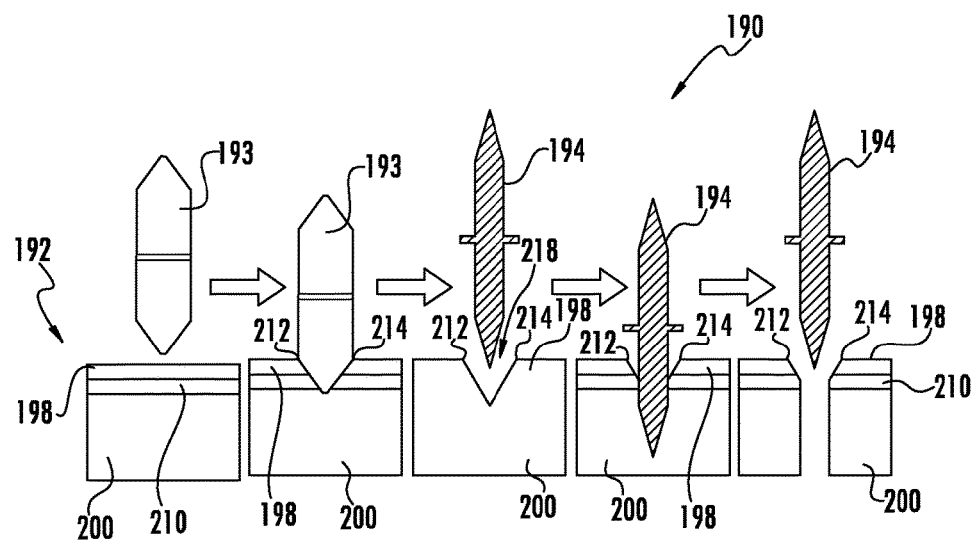
FIG. 10 illustrates another method for shaping a laminated glass structure in accordance with aspects of the disclosure.

Referring to FIG. 10, another multi-step method 190 of shaping a preform laminated glass structure 192 using multiple, differently sized abrasive wheels 193 and 194 as the cutting tools is illustrated. Alternatively, one or more differently sized router bits may be used as the first and/or second tools, i.e., instead of either one or both of the abrasive wheel 193 or the abrasive wheel 194. The preform laminated glass structure 192 may be supported on a surface of a support structure, such as a reciprocating table with a flexible glass sheet 198 of the preform laminated glass structure 192 facing away from the surface of the support structure and a non-glass substrate 200 sandwiched between the flexible glass sheet 198 and the support structure 196. A mask may be applied to a broad surface along with clamps, as described above.

The abrasive wheel 193 cuts through the flexible glass sheet 198 and adhesive layer 210 and can make a shallow cut or scribe in the non-glass substrate 200 in a fashion similar to that described above. The abrasive wheel 193 may have a grit size much less than the thickness of the flexible glass sheet 198, which can minimize chipping of the cut edges 212 and 214. For example, the grit size may be between 320 and 1200. Use of an abrasive wheel 193 with a grit size in this range can produce a cut edge 212, 214 with chips less than about 15 μm in size an edge strength of greater than about 20 MPa (for example greater than about 50 MPa, 60 MPa, 70 MPa, 80 MPa, 90 MPa, or 100 MPa). The abrasive wheel 193 may also be sized to form a kerf 218 wider than a thickness of the abrasive wheel 194 to allow access by the abrasive wheel 194 to the non-glass substrate 200 without contacting the cut edges 212 and 214. In some embodiments, corners of the cut edges 212 and 214 may be ground to an angle of less than 90 degrees. Such an obtuse angle at the cut edges 212 and 214 can reduce the susceptibility of the cut edges 212 and 214 to damage and reduced strength. The cut edges 212 and 214 are also supported by the adhesive layer 210 during the grinding process, which can stabilize and obtain higher quality edge finishes.

Next, the abrasive wheel 194 enters the kerf 218 and is used to grind the non-glass substrate 200. In the illustrated embodiment, the abrasive wheel 194 grinds the non-glass substrate 200 through the kerf 218. However, the non-glass substrate 200 may be cut from the opposite side 219. In either case, the abrasive wheel 194 may be aligned with the kerf 218 to avoid contact with the cut edges 212 and 214. A finishing process may be employed as described above, depending on glass chip size.

Figure 11:
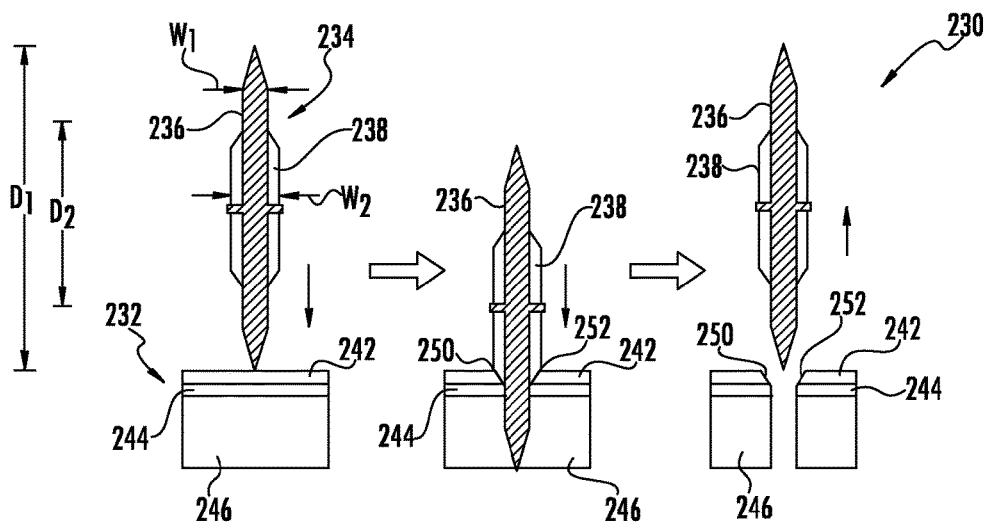
FIG. 11 illustrates another method of shaping a laminated glass structure in accordance with aspects of the disclosure.

Referring to FIG. 11, another single step method 230 of shaping a preform laminated glass structure 232 is illustrated. In this embodiment, an abrasive wheel 234 has regions 236 and 238 having different diameters, widths and grit sizes as the cutting tools. For example, region 236 has a width $W_1$ and a diameter $D_1$ and region 238 has a width $W_2$ and a diameter $D_2$. Region 236 may be located in the center of region 238 and have a width $W_1$, diameter $D_1$ and grit size to cut through a preform laminated glass structure 240 including flexible glass sheet 242, adhesive layer 244 and non-glass substrate 246, for example, during a single pass. The region 238 may have a width $W_2$, diameter $D_2$ and grit size to contact cut edges 250 and 252 and grind/polish the cut edges 250 and 252 as the abrasive wheel 234 indexes down in the Z-direction. The region 238 may also impart a shape or bevel to the cut edges, such as a 45 degree angle. The grit size of the region 238 may be selected to be fine enough to reduce chip depths to less than about 10 μm to maintain an edge strength of greater than about 20 MPa (for example greater than about 50 MPa, 60 MPa, 70 MPa, 80 MPa, 90 MPa, or 100 MPa). Alternatively, a router bit having different diameters, widths, and/or tooth patterns may be used as the cutting tools as described in connection with FIG. 11.

The systems and methods of shaping laminated glass structures described above allow for use of manufacturing-based cutting methods and machines, such as grinding machines and WEDM machines with minimal damage while maintaining edge strengths of the flexible glass sheets of at least about 20 MPa (for example greater than about 50 MPa, 60 MPa, 70 MPa, 80 MPa, 90 MPa, or 100 MPa). The laminated glass structures may be masked to prevent incidental scratching of the flexible glass sheets by the tools and inhibit attachment of glass particles to the flexible glass sheet. Glass chips as large as 900 to 1200 μm can be created during cutting which can be finished with a one or two-step finishing process to obtain glass chip sizes less than 10 microns, such as less than five microns in depth. Use of climb cutting orientations apply a compressive force to the flexible glass sheet during cutting using the cutting tool which allows for edge strengths of the flexible glass sheets to be maintained above 20 MPa (for example greater than about 50 MPa, 60 MPa, 70 MPa, 80 MPa, 90 MPa, or 100 MPa).

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A method of shaping a laminated glass structure comprising a flexible glass sheet having a thickness of no greater than about 0.3 mm laminated to a non-glass substrate by an adhesive layer, the method comprising:
   cutting the flexible glass structure and adhesive layer using a first tool to remove glass material; and
   cutting the non-glass substrate with a second tool different from the first tool through a kerf formed through the flexible glass structure thereby forming a shaped laminated glass structure;
   wherein a glass edge strength of a cut edge of the shaped laminated glass structure is at least about 20 MPa.

2. The method of claim 1, wherein the first tool is an abrasive wheel having an ISO/FEPA grit designation of at least 180.

3. The method of claim 1, wherein the second tool is a metal wire electrode of a wire-cut EDM machine.

4. The method of claim 1, wherein the first tool is a first abrasive wheel and the second tool is a second abrasive wheel having an ISO/FEPA grit designation different from the first abrasive wheel.

5. The method of claim 4, wherein the step of cutting the flexible glass structure and adhesive layer using the first tool comprises grinding the flexible glass structure using the first abrasive wheel to form the kerf.

6. The method of claim 5, wherein the second abrasive wheel has a width less than a width of the kerf.

7. The method of claim 1, wherein the first tool is an abrasive wheel and the second tool is a metal wire electrode of a wire-cut EDM machine.

8. The method of claim 7, wherein the step of cutting the flexible glass structure and adhesive layer using the first tool comprises grinding the flexible glass structure using the abrasive wheel to form the kerf.

9. The method of claim 8, wherein the metal wire electrode has a diameter less than a width of the kerf.

10. The method of claim 1, wherein the first tool is a first region of an abrasive wheel having a first ISO/FEPA grit designation and the second tool is a second region of the abrasive wheel having a second ISO/FEPA grit designation different from the first ISO/FEPA grit designation.

11. A method of shaping a laminated glass structure comprising a flexible glass sheet having a thickness of no greater than about 0.3 mm laminated to a non-glass substrate by an adhesive material;
    supporting the preform laminated glass structure on a support surface such that the non-glass substrate is located between the flexible glass sheet and the support surface; and
    cutting the non-glass substrate with a tool through a kerf formed through the flexible glass structure thereby forming a shaped laminated glass structure.

12. The method of claim 11, wherein a glass edge strength of a cut edge of the shaped laminated glass structure at least about 20 MPa.

13. The method of claim 11, wherein the tool is an abrasive wheel having an ISO/FEPA grit designation of at least 180.

14. The method of claim 11, wherein the tool is a first tool, the method further comprising cutting the flexible glass structure and adhesive layer using a second tool forming the kerf.

15. The method of claim 14, wherein second tool is a metal wire electrode of a wire-cut EDM machine.

16. The method of claim 14, wherein the first tool is a first abrasive wheel and the second tool is a second abrasive wheel having an ISO/FEPA grit designation different from the first abrasive wheel.

17. The method of claim 16, wherein the first abrasive wheel has a width less than a width of the kerf.

18. The method of claim 14, wherein the first tool is a metal wire electrode of a wire-cut EDM machine and the second tool is an abrasive wheel.

19. The method of claim 18, wherein the metal wire electrode has a diameter less than a width of the kerf.

20. The method of claim 14, wherein the first tool is a first region of an abrasive wheel having a first ISO/FEPA grit designation and the second tool is a second region of the abrasive wheel having a second ISO/FEPA grit designation different from the first ISO/FEPA grit designation.

* * * * *